Figure 3:
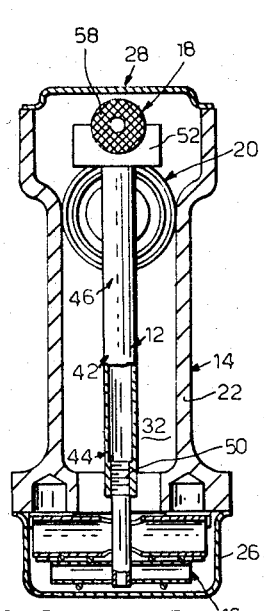

Oct. 3, 1967    J. S. HELLEN    3,344,675
PIVOTAL CONNECTION
Filed Sept. 24, 1964

JAMES S. HELLEN
INVENTOR.

BY
Thomas W. Kennedy
ATTORNEY

# United States Patent Office 3,344,675
Patented Oct. 3, 1967

3,344,675
PIVOTAL CONNECTION
James S. Hellen, Wayne, N.J., assignor to General Precision Inc., Little Falls, N.J., a corporation of Delaware
Filed Sept. 24, 1964, Ser. No. 398,991
13 Claims. (Cl. 73—517)

The present invention relates to pivotal connections and more particularly to low-restraint pivotal connections.

In various precision instruments, such as inertial gyroscopes, pendulum accelerometers and aneroid barometers, a moving or supported member is pivotally supported by a pair of pivotal connections from a supporting structure.

Prior-art pivotal connections are usually flexure members as more fully described in a survey titled "Flexure Devices" by P. J. Geary, 1954, Research Report M–18, British Scientific Instrument Research Association, Kent, Great Britain.

Prior-art flexure members have an undesirably high restraining moment due to a spring rate in bending, which urges the flexure member toward its unstressed or null position causing instrument errors.

Another problem with the above-mentioned flexure members is that they cannot effectively resist force components in all three orthogonal axes of an acceleration or other shear force acting thereon.

In accordance with one embodiment of the present invention, a pivotal connection is used having a low-friction rolling cylinder and a base member tied together by a high tensile, low hysteresis wire, which is wrapped in a helical direction around the cylinder and which has ends connected to the base member. With such a pivotal connection, according to the invention, there is substantially no variable spring rate and substantially no restraining moment when used in a pendulum-type accelerometer, thereby minimizing instrument errors.

Accordingly, it is one object of the invention to provide a low-restraint and low-friction pivotal connection with substantially no spring rate.

It is another object of the invention to provide a pivotal connection which can effectively transmit components of loads and forces in three orthogonal axes.

It is a further object of the invention to provide a pre-stressed pivotal connection with substantially zero spring rate.

It is a still further object of the invention to provide a rolling-hinge type of pivotal connection and to minimize the area of frictional contact between its parts.

To the fulfillment of these and other objects the invention provides a pivotal connection assembly comprising a rocker member, a base member and a pair of diagonal filaments. The rocker member has an arcuate bearing surface; the base member has a bearing surface confronting the arcuate surface and separated therefrom by a gap. The pair of diagonal filaments interconnect portions of the rocker member to adjacent portions of the base member for rocking movement therebetween. The diagonal filaments have opposite end portions connecting to rocker member and to the base member urging them together, the end portions extending in opposite diagonal directions from the gap alongside the rocker and base surfaces thus bracing against transverse displacement therebetween. The diagonal filaments have center portions clamped in the gaps between the confronting bearing surfaces for a multi-point bearing therebetween, the center portions have a helical shape that reverses in curvature at a variable clamping point within the gap.

Figure 1:
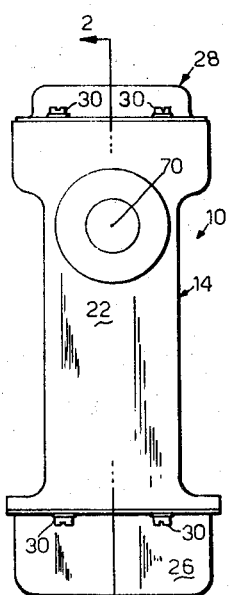
Figure 2:
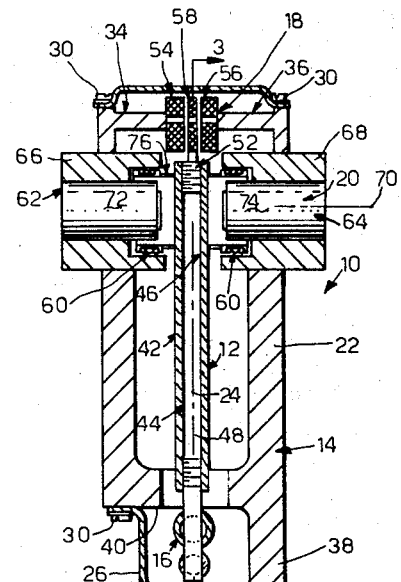
Figure 4:
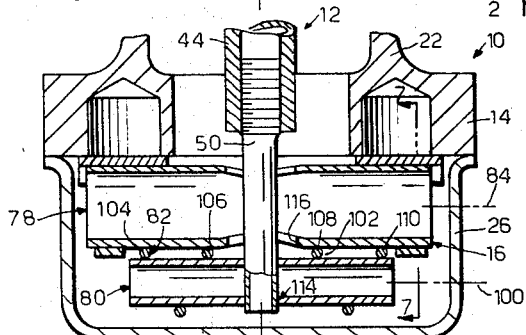
Figure 5:
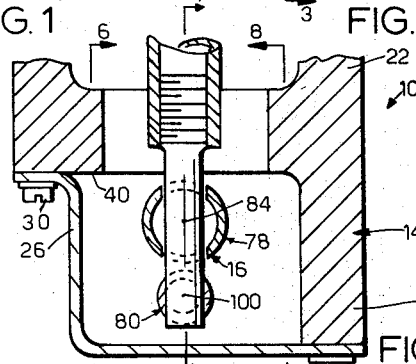
Figure 6:
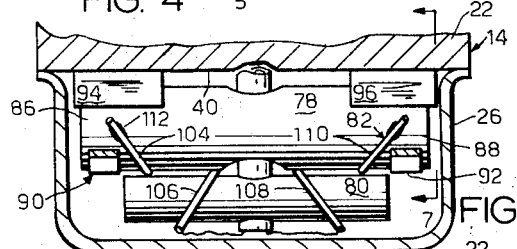
Figure 7:
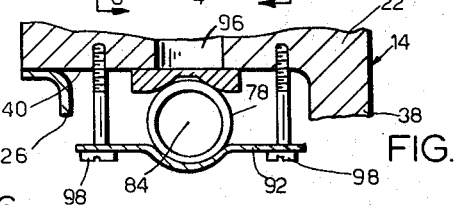
Figures 8, 9:
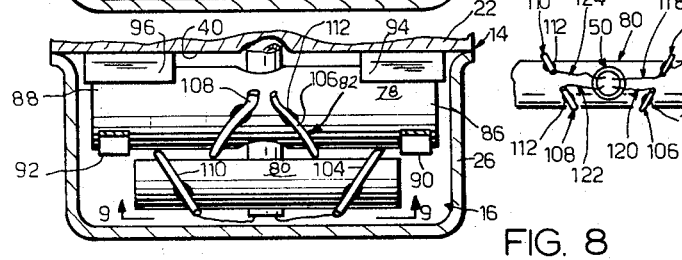

Other objects of the invention will become apparent upon reading the annexed detail description in connection with the drawings wherein like parts are designated by like numerals throughout the several views, and wherein:

FIGURE 1 is an exterior view of an inverted pendulum-type accelerometer embodying features of the present invention;
FIGURE 2 is a sectional view taken along line 2—2 of FIGURE 1;
FIGURE 3 is a sectional view taken along line 3—3 of FIGURE 2;
FIGURE 4 is an enlarged view of a portion of FIGURE 3;
FIGURE 5 is a sectional view taken along line 5—5 of FIGURE 4;
FIGURE 6 is a sectional view taken along line 6—6 of FIGURE 5;
FIGURE 7 is a sectional view taken along line 7—7 of FIGURE 4;
FIGURE 8 is a sectional view taken along line 8—8 of FIGURE 5; and
FIGURE 9 is a sectional view taken along line 9—9 of FIGURE 8.

Referring to FIGURES 1, 2 and 3, one embodiment of the present invention comprises an accelerometer 10, which is a single-axis, pendulum-type accelerometer. Accelerometer 10 comprises a pendulous arm 12, which is pivotally supported from a housing 14 by a pivotal support means 16. Accelerometer 10 also has a pickoff means 18 for measuring displacement of pendulum 12 relative to housing 14, and has a torquer means 20 for urging pendulum 12 toward its null position.

Housing 14 has a peripheral wall 22 of rectangular cross-section, and has an elongate housing axis 24 about which the peripheral wall 22 is symmetrically disposed. Housing 14 also has a pair of axially spaced end coverplates 26, 28, which are sealingly joined to each end of peripheral wall 22 by bolts 30 or the like. Wall 22 and plates 26, 28 enclose a substantially leak-proof cavity 32, which preferably contains a damping fluid (not shown). Housing 14 also has a diaphragm (not shown) for slight adjustment of the cavity volume to compensate for a temperature-volume change in the fluid. Peripheral wall 22 has a pair of projections 34, 36, extending in a radially inward direction from opposite sides of wall 22 for supporting portions of pickup means 18 as explained hereafter. Peripheral wall 22 also has an axially outwardly projecting wall portion 38 and an end face 40 adjacent end plate 26, for use as a mounting surface on which the pivotal support means 16 is attached, as explained hereafter.

Pendulum arm 12 includes a tubular member 42 of elongate, cylindrical shape which has a pivotal end portion 44 and a free end portion 46. Pendulous arm 12 has a longitudinal axis 48, which is substantially coincident with housing axis 24 when pendulous arm 12 is in a null position, as illustrated in FIGURE 2. Pendulous arm 12 has a coaxial, hollow support rod 50, threaded into the tube pivotal end 44; and has a coaxial hollow bracket plug 52, threaded into the tube free end 46. Support rod 50 is fixedly connected at its axially outer end to the pivotal support means 16; bracket plug 52 supports a portion of the pickoff means 18; and tube free end portion 46 supports a portion of the torquer means 20, as explained hereafter.

Pickoff means 18 includes a pair of stator coils 54, 56, and a signal coil 58 for producing a signal upon the displacement of pendulous arm 12 relative to housing 14. Stator coils 54, 56 are respectively mounted on wall projections 34, 36 and are disposed opposite to each other in spaced relation therebetween. Signal coil 58 is disposed in the space between stator coils 54 and 56. Signal coil 58 is fixedly connected to bracket plug 52 so that a slight displacement of pendulum 12 causes signal coil 58 to displace relative to stator coils 54, 56. Stator coils 54, 56 are normally energized to establish a magnetic flux field in the space therebetween. Such displacement of signal coil 58 induces a voltage in signal coil 58 with a polarity depending on the direction of movement, whereby a suitable signal is produced. Stator coils 54, 56 are designed to be wired directly to terminals (not shown) on wall 22. The wiring of signal coil 58 is explained hereafter.

Torquer means 20 includes a torquer coil 60, and a pair of magnets 62, 64. Magnet 62 and a portion of coil 60 is disposed on one side of pendulous arm 12, and magnet 64 and a portion of coil 60 is disposed on the other side of pendulous arm 12, for urging pendulous arm 12 toward its null position with its axis 48 aligned with housing axis 24. Magnets 62, 64 have respective magnetic holders 66, 68, fixedly connected to opposite portions of peripheral wall 22, and coaxial along an axis 70, that is substantially at right angles to housing axis 24. Magnets 62, 64 have respective magnetic cores 72, 74 fitted into their holders 66, 68. Torquer coil 60 is mounted on a hollow cylinder 76 fixedly connected to tube free end 46. Torquer coil 60 respectively surrounds cores 72, 74, is spaced therefrom, and is axially movable relative thereto. Pickoff 18 sends signals to a resolver (not shown), which in turn controls torquer 20. Wiring of torquer coil 60 is explained hereafter.

The construction of a single-axis, pendulum-type accelerometer is more fully described in U.S. Patent 2,985,021.

According to the invention, pivotal support means 16 comprises a base cylinder 78, a rocking cylinder 80 and tensioned diagonal means 82 arranged to mount the pendulous arm 12 on the housing 14. Base cylinder 78, which is preferably a hollow cylindrical member, whose axis 84 is substantially at right angles to housing axis 24, has end portions 86, 88 respectively mounted on housing end face 40 by a pair of flexure clamps 90, 92 and a pair of positioning pins 94, 96. Pins 94, 96 are mounted on end face 40 and have respective heads projecting therefrom with grooved faces disposed under each end 86, 88 for positioning and for centering said ends. Clamps 90, 92 which are preferably flexible elongate strips, are arranged to bear against the radially outer surfaces of ends 86, 88 for urging said ends 86, 88 against respective pins 94, 96. Clamps 90, 92 have a bolt 98, or a like connection, at each end thereof connecting to end face 40.

Rocker cylinder 80 has a rocking movement relative to base 78; has an axis 100 moving parallel to base cylinder axis 84 during said rocking movement; and has a cylindrical exterior surface confronting the exterior surface of base 78, and separated therefrom by a gap 102, that is substantially equal to the thickness of said tensioned diagonal means 82.

Tensioned diagonal means 82, which is clamped between rocker 80 and base 78, includes four filaments 104, 106, 108, 110; each of which is preferably an electrically-conductive, flexible, high-tensile, low-hysteresis, mono-filament wire; and each of which extends through gap 102, having one end connected to base cylinder 78 and an opposite end connecting to rocker cylinder 80, by connecting means 112, such as adhesive cement or the like.

Rocker cylinder 80 is rigidly connected to the axially outer end of rod 50. Rocker cylinder 80 has a hole 114 (FIGURE 4), which is drilled transversely to axis 100, for receiving rod 50. Rod 50 is preferably press-fitted into hole 114, to provide a rigid connection between cylinder 80 and rod 50. Base cylinder 78 has an oversize hole 116 through which rod 50 passes without contact therebetween and to prevent interference therebetween during displacement of pendulum 12 relative to housing 14.

Filaments 104, 106 108, 110 have respective wires 118, 120, 122, 124 (FIG. 9), which are connected respectively thereto by soldering or the like, and which respectively extend from said filaments 104, 106, 108, 110, alongside cylinder 80 and through the end of hollow rod 50. From there, wires 118, 120, 122, 124 extend through the interior of tube 42, and out through hollow plug 52. Wires 118, 120 extend from plug 52 to signal coil 58 connecting thereto; and wires 122, 124 extend from plug 52 to torquer coil 60, connecting thereto. In this way, filaments 104, 106, 108, 110 replace the conventional type of flex leads normally used to connect wires on pendulum 12 to respective wires on housing 14. Thus, conventional flex lead restraints are avoided and accelerometer instrument error is minimized.

For ease of illustration, the thickness of the filaments 104, 106, 108, 110 in the drawings (FIGS. 3, 4, 6 and 8) have been greatly exaggerated. Each of said filaments has a reverse helical shape with the point of curve reversal coinciding with the point of clamping within the gap 102.

Pivot 16 is a low-friction pivot because it has rolling friction instead of sliding friction between its parts, and because the area of contact of said rolling friction is minimized. Pivot 16 is a low-restraint pivot because each of its flexible filaments 104, 106, 108, 110 has a small cross-sectional area which minimizes bending resistance. Pivot 16 is a long-life pivot because its hinge axis shifts slightly during its rocking movement so that the point of filament bending also shifts whereby fatigue stresses in the filament are avoided.

Filaments 104, 106, 108, 110 are preferably slightly pre-stressed in tension to minimize any displacement of rocker cylinder 80 relative to base cylinder 78 other than their rocking motion, to take up any filament slack during assembly, and to avoid buckling of said filaments during operation. In addition, said filaments 104, 106, 108, 110 are pre-stressed to assure the continuous urging of rocker cylinder 80 against base cylinder 78 compressing said filaments therebetween slightly whereby axis 100 is maintained continuously parallel to base cylinder axis 84.

Filaments 104, 106, 108, 110 are preferably wires of round cross-section to minimize the area of contact and rolling friction between rocker 80 and base 78 whereby dust particle restraints and the like are minimized.

Rocker 80 and base 78 are preferably composed of an electrically-insulating material to provide electrical insulation for a bare-wire type of filament. Rocker 80 and base 78 are also preferably composed of a material of low thermal conductivity to minimize the capacity of pivot 16 acting as a heat sink.

Rocker 80, base 78, and filaments 104, 106, 108, 110 are preferably composed of materials having substantially the same coefficient of thermal expansion in order to minimize temperature-expansion stresses in said filaments.

Rocker 80 and base 78 are preferably composed of leaded glass, and filaments 104, 106, 108, 110 are preferably made of tungsten wires whereby said filaments have substantially the same coefficient of expansion as said rocker 80 and base 78 and whereby said filaments are electrically conductive wires.

Filaments 104, 106, 108, 110 are preferably oppositely sloped relative to rocker axis 100, in the manner of cross-bracing. The angle of slope of each of said filaments, that is the advance in curvature of the wire turn relative to the rocker axis 100, should be large enough to resist an acceleration force component acting parallel to the rocker axis and should be small enough to resist a component of said force acting transverse to said rocker axis 100. Thus the tensioned diagonal means 82 functions in the manner of cross-bracing, capable of resisting the three orthogonal components of any acceleration force, or other shear force, on pivot 16.

In summary, this embodiment 10 according to the invention provides a low-restraint and low-friction pivot 16 with substantially no restraining moment and no spring rate, which can effectively transmit therethrough components of loads and forces from any direction in three orthogonal axes applied thereon.

While the present invention has been described in a preferred embodiment, it will be obvious to those skilled in the art that various modifications can be made therein within the scope of the invention, and it is intended that the appended claims cover all such modifications.

What is claimed is:

1. A pivotal connection assembly comprising:
   a rocker member with an arcuate bearing surface;
   a base member with a bearing surface confronting said arcuate surface and separated therefrom by a gap; and
   tensioned diagonal means including a pair of diagonal filaments interconnecting portions of the rocker member to adjacent portions of said base member for rocking movement therebetween, said filaments having opposite end portions connecting to the rocker member and to the base member urging them together and extending in opposite diagonal directions from said gap and alongside the rocker and base surfaces for bracing against transverse displacement therebetween, and having center portions clamped in the gaps between the confronting bearing surfaces for point bearing therebetween, said center portions having a helical shape that reverses in curvature at a variable clamping point within the gap.

2. The pivotal assembly as claimed in claim 1, in which said filaments are pre-stressed to minimize any displacement of said rocker member relative to said base member other than rocking motion.

3. The pivotal assembly as claimed in claim 1, in which the diagonal filaments are wires of round cross-section to minimize dust particle restraints.

4. The pivotal assembly as claimed in claim 1, in which said rocker member and said base member are composed of electrical insulation material to electrically insulate a bare-wire filament.

5. The pivotal assembly as claimed in claim 1, in which the rocker member and the base member are composed of material of low thermal conductivity to prevent the pivotal assembly acting as a heat sink.

6. The pivotal assembly as claimed in claim 1, in which the diagonal filaments are composed of materials having the same coefficient of expansion as said rocker member and said base member to minimize temperature-expansion stresses in said filaments.

7. The pivotal assembly as claimed in claim 1, in which said rocker member and said base member are composed of leaded glass and said diagonal filaments are made of tungsten wires of substantially the same coefficient of expansion as said leaded glass material.

8. The pivotal assembly as claimed in claim 1, in which the diagonal filaments are oppositely sloped for cross-bracing the rocker member against the base member;
   the angle of slope being large enough to resist a component of a sheer force acting parallel to said rocker member and being small enough to resist a component of said force acting transverse to said rocker member.

9. The pivotal assembly as claimed in claim 1, in which said tensioned diagonal means includes a third diagonal filament of substantially identical construction to said pair of diagonal filaments for interconnecting a portion of said rocker member to an adjacent portion of said base member disposed intermediate of said pair of diagonal filaments thereby to minimize transverse twisting of said rocker member relative to said base member.

10. Pivot means for supporting a pendulum from a housing of a single-axis accelerometer comprising:
    a rocker beam having a center portion connecting to the pendulum and having end portions with respective bearing surfaces;
    a pair of base members connecting to said housing and respectively supporting the ends of said rocker beam and having bearing surfaces respectively confronting said bearing surfaces of said rocker beam, one of each pair of confronting surfaces being arcuate in profile;
    two pairs of diagonal filaments respectively interconnecting said beam ends to their base members, each pair of diagonal filaments extending from opposite sides of its end of said rocker beam to opposite sides of the adjacent base member, each diagonal filament having a center portion with a point clamped between said confronting surfaces and with a helical shape that reverses in curvature at its clamping point and having an end portion connecting to said rocker beam and having an opposite end portion connecting to said base member.

11. The pivot means as claimed in claim 10, in which the diagonal filaments are electrically conductive flex-lead wires for carrying current from housing leads to pendulum leads.

12. The pivot means as claimed in claim 10, in which said housing of the accelerometer contains damping fluid in which said pivot means is immersed to thereby minimize a temperature difference between said rocker beam, base members and said filaments.

13. A pivotal connection assembly comprising:
    a base body having an arcuate surface with an axis of generation;
    a rocker body having a radially-outer helically-shaped surface with an axis of generation parallel to said base axis and with a plurality of axially-spaced helically-shaped portions; and
    a plurality of filaments for separating and interconnecting said rocker body and said base body respectively clamped between the helically-shaped surface portions and said arcuate surface, with each filament extending in diagonally opposite directions in a plane oblique to said axes and wound along one of said helix surface portions in one direction and wound along an adjacent portion of said opposite arcuate surface in the other direction.

References Cited

UNITED STATES PATENTS

| | | | |
|---|---|---|---|
| 2,674,502 | 4/1954 | Faxen | 308—2 |
| 2,838,700 | 6/1958 | Bligard | 267—1 X |
| 2,947,176 | 8/1960 | Perry | 73—517 |
| 2,985,021 | 5/1961 | Lewis et al. | 73—517 |

FOREIGN PATENTS 273,987  6/1951  Switzerland.

JAMES J. GILL, *Primary Examiner.*